(12) United States Patent
Morris

(10) Patent No.: US 7,131,805 B1
(45) Date of Patent: Nov. 7, 2006

(54) INFLATABLE CARGO COVER AND METHOD OF COVERING CARGO

(75) Inventor: Kevin B. Morris, Arvada, CO (US)

(73) Assignee: Coors Global Properties, Inc., Lakewood, CO (US)

( * ) Notice: Subject to any disclaimer, the term of this patent is extended or adjusted under 35 U.S.C. 154(b) by 0 days.

(21) Appl. No.: 11/112,089

(22) Filed: Apr. 22, 2005

(51) Int. Cl.
*B61D 45/00* (2006.01)

(52) U.S. Cl. ........................................... 410/119
(58) Field of Classification Search ............... 410/118, 410/119; 206/522
See application file for complete search history.

(56) References Cited

U.S. PATENT DOCUMENTS

| | | | |
|---|---|---|---|
| 3,089,153 A * | 5/1963 | Bosc ............................. | 5/710 |
| 3,346,101 A * | 10/1967 | Pestka ........................ | 206/522 |
| 3,548,904 A | 12/1970 | Mackell | |
| 3,554,135 A * | 1/1971 | Duvall et al. ............... | 410/119 |
| 3,653,084 A | 4/1972 | Hartman | |
| 4,076,872 A * | 2/1978 | Lewicki et al. .............. | 428/12 |
| 4,140,237 A | 2/1979 | Hickey | |
| 4,272,119 A | 6/1981 | Adams | |
| 4,793,123 A * | 12/1988 | Pharo .......................... | 53/449 |
| 4,847,126 A * | 7/1989 | Yamashiro et al. ........ | 428/35.2 |
| 4,981,391 A | 1/1991 | Klementovich | |
| 5,042,663 A * | 8/1991 | Heinrich ...................... | 206/522 |
| 5,064,237 A | 11/1991 | Cline | |
| 5,489,464 A * | 2/1996 | Bjorck ........................ | 428/178 |
| 5,494,394 A | 2/1996 | Podd et al. | |
| 5,829,627 A * | 11/1998 | Martindale .................. | 220/666 |
| 6,253,806 B1 * | 7/2001 | Sperry et al. ............... | 141/314 |
| 6,978,893 B1 * | 12/2005 | Peper .......................... | 206/522 |
| 2001/0006083 A1 | 7/2001 | Haberkorn | |
| 2002/0073629 A1 | 6/2002 | Finell | |
| 2003/0165368 A1 * | 9/2003 | Rostoker ..................... | 410/118 |
| 2004/0047702 A1 | 3/2004 | Williams et al. | |
| 2005/0263426 A1 * | 12/2005 | Ho ............................. | 206/522 |

FOREIGN PATENT DOCUMENTS

JP       355091434 A  *  7/1980  ................. 410/119

* cited by examiner

*Primary Examiner*—H Gutman
(74) *Attorney, Agent, or Firm*—Sheridan Ross PC

(57) ABSTRACT

A cargo cover includes an inflatable portion and an interior panel spanning between the inflatable portion. The inflatable portion forms a periphery of the cover. An inflation port is located at one end of the cover and communicates with the inflatable portion. Prior to use, the cover may be rolled-up. The rolled-up cover is positioned over a cargo load, and an inflation source introduces air through the inflation port to inflate the inflatable portion. As the inflatable portion inflates, the cover unrolls and thereby self-deploys over the cargo load.

19 Claims, 4 Drawing Sheets

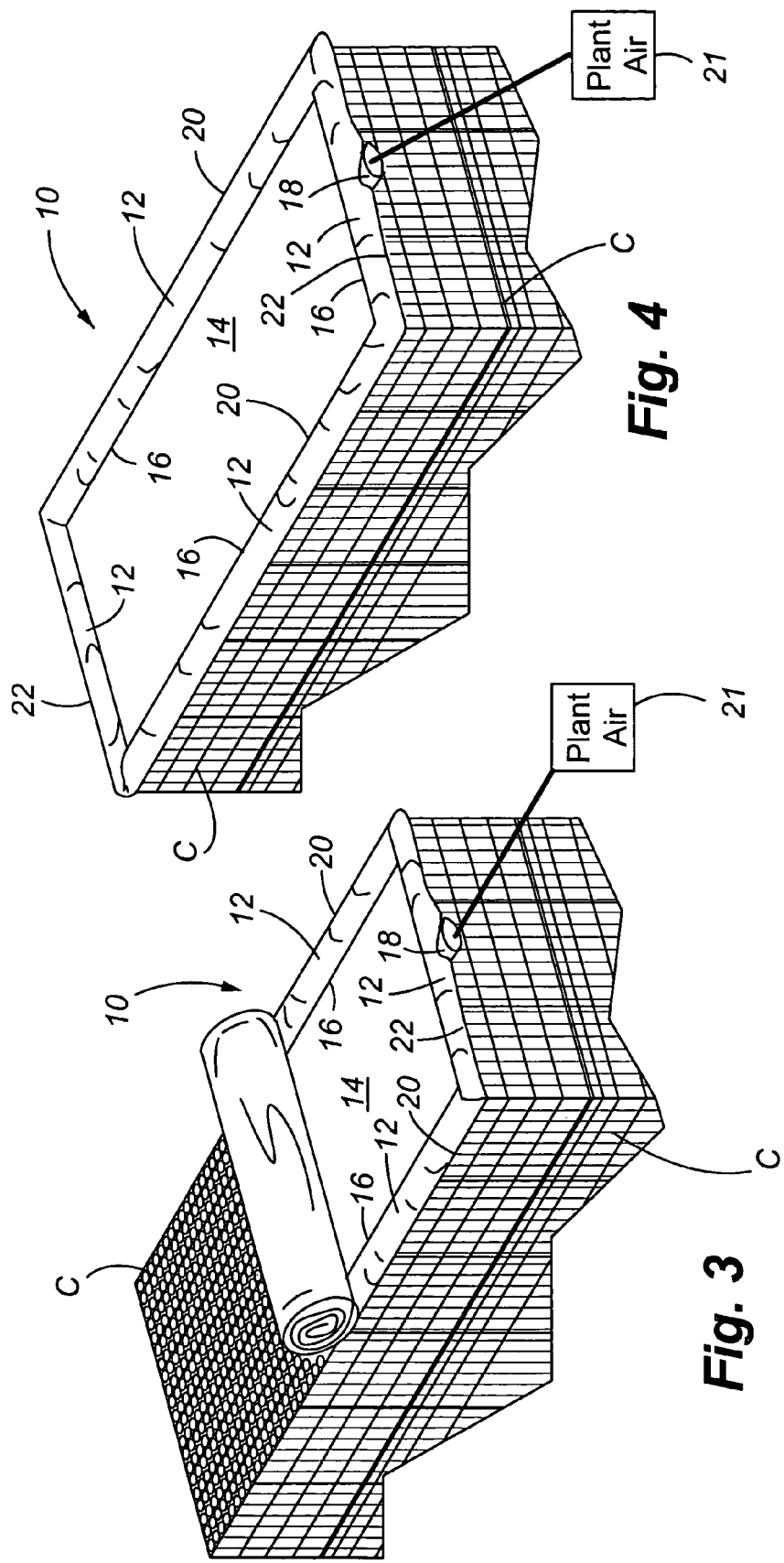

INFLATABLE CARGO COVER AND METHOD OF COVERING CARGO

FIELD OF THE INVENTION

The present invention relates to covers or blankets that insulate cargo, and more particularly, to an inflatable cargo cover that is deployed over a cargo load by a flow of air introduced in an inflatable portion of the cargo cover.

BACKGROUND OF THE INVENTION

Cargo covers or blankets are commonly used to cover cargo loaded on a truck, plane, or ship in order to insulate the cargo and maintain it at a desired temperature. One type of cargo often requiring a cover is canned or bottled beverages that must remain chilled during shipment. This type of cargo is commonly shipped in cargo trailers hauled by a truck. The cargo cover is placed over the top exposed surface of the cargo load.

Because of the prohibitive costs of using a refrigeration unit for most cargo, cargo containers such as cargo trailers maintain the temperature of the cargo by use of an insulated cargo space (for example insulated sidewalls, ceiling and flooring) in combination with a cargo blanket. For beverages such as beer, it is undesirable for the beer to freeze or to heat beyond an upper temperature limit. Thus, it is critical that the cargo cover used be capable of providing adequate insulation to maintain the cargo within the desired temperature range. Of course, depending upon the season in which the cargo is shipped, the cargo may be exposed to various temperature extremes, and the cargo cover should have known insulative properties that protect the cargo from freezing and from reaching upper temperature limits.

These cargo blankets are constructed of heavy cotton panels with vinyl covers. These cargo covers are quite heavy, and are also quite difficult to deploy over the cargo load. Because of the weight of the covers, multiple smaller covers must be typically used to cover the entire load. Also, these cargo blankets must be deployed from the rear of the trailer (the end closest to the truck). If a trailer is first fully loaded, the user must often times crawl over the loaded cargo and therefore work in a very constrained space to deploy the cargo blankets. Alternatively, if the cargo trailer is incrementally loaded, a first cargo blanket is deployed over the loaded cargo, and then loading of the trailer is continued with incremental loads causing the user to separately deploy subsequent cargo blankets, one at a time. With either method of loading the cargo, multiple cargo blankets must be used and a considerable amount of physical effort is required to deploy the blankets.

SUMMARY OF THE INVENTION

Based upon the shortcomings of prior art cargo blankets, it is one object of the present invention to provide a cargo cover that is lightweight and easily deployed over a large cargo load thus eliminating the inherent difficulties in deploying multiple and heavy cargo blankets. It is yet another object of the present invention to provide a cargo cover that provides adequate insulation for isolating the cargo from the environment, yet is much lighter and more easily deployed than standard cargo blankets. It is yet another object of the present invention to substantially increase efficiency and safety in terms of how a cargo cover is deployed over a fully loaded cargo container, thus eliminating the need for a user to enter a cargo container for deploying one or more cargo covers. It is yet another object of the present invention to provide a cargo cover that may be easily stored after use and that may be installed by a single person.

In accordance with the present invention, each of the foregoing objectives are achieved by an inflatable cargo cover or blanket that is used to cover a cargo loaded within a cargo container such as a cargo trailer. In the preferred embodiment, the cargo cover includes an inflatable portion that defines a periphery of the cargo cover, and an interior panel that spans between the inflatable portion. The cargo cover can be shaped to match the particular size cargo container. For example, most cargo trailers have a rectangular shape, and the cargo cover of the present invention may be formed in the same rectangular shape to match the cargo container so when the cover is deployed, it covers all cargo loaded within the cargo container. Thus, a single cover is used and multiple covers are avoided.

The inflatable portion is preferably in the form of a tubular member that extends around a periphery of the cargo cover. An inflation port is formed in the inflatable portion whereby a flow of air introduced through the inflation port allows the inflatable portion to be inflated. Prior to use, the cargo cover is rolled up in a very compact configuration. When the cargo cover is to be deployed over a cargo loaded within a cargo container, the cover is placed at the forward end of the cargo container and centered over the cargo. An inflation source is then connected to the inflation port for providing a flow of air through the inflation port and into the inflatable portion. One well-suited inflation source can be compressed air generated from an air compressor, such as plant air found in most industrial facilities. As the inflatable portion inflates, it causes the cargo cover to unroll in a controlled manner (based on the flow rate of air entering the inflatable portion). As the cover unrolls, the user may slightly shift or adjust the orientation of the cargo cover so that the cargo cover uniformly covers the entire cargo loaded within the container. When the cargo cover is fully deployed over the cargo, the inflatable portion preferably contacts the interior sidewalls of the cargo container to ensure that the cargo is fully covered and there are no large gaps between the cargo and sidewalls of the trailer. The inflation device is then removed from the inflation port and the inflatable portion is allowed to deflate. After deflation, the cargo is still covered, and any gap between the interior sidewalls of the cargo container and the cargo is either filled by the inflatable portion in contact with the sidewalls, or the inflatable portion drapes over the side edges of the cargo and extends down over the side edges of the cargo.

After use, the cargo cover may be rolled up and stored. Because the cargo cover can be completely rolled, it maintains a relatively compact shape that is easy to transport and store. A band or strap can be used to keep the cargo cover in the rolled-up configuration.

The cargo cover of the present invention enables a user to more easily cover a cargo load because the user does not have to actually enter the cargo container and manually manipulate the cargo cover over the load. The cargo cover of the present invention is self-deployable by use of the inflation source to inflate the inflatable portion. Because the cargo cover may be made of a very lightweight material, the cargo cover is much more easy to install over cargo as well as to store and transfer the cover between cargo containers. Use of the cargo container enhances productivity by decreasing the amount of time and effort required to deploy the cargo cover. The cargo cover can also be made of materials that make the cargo cover much less expensive than traditional cargo blankets.

Various other features and advantages of the present invention will become apparent from a review of the following detailed description taken with the drawings.

BRIEF DESCRIPTION OF THE DRAWINGS

FIG. 3 is a perspective view illustrating the cargo cover being deployed over a cargo load;

FIG. 4 is another perspective view illustrating the cargo cover fully deployed over the cargo load;

DETAILED DESCRIPTION

Figure 1:
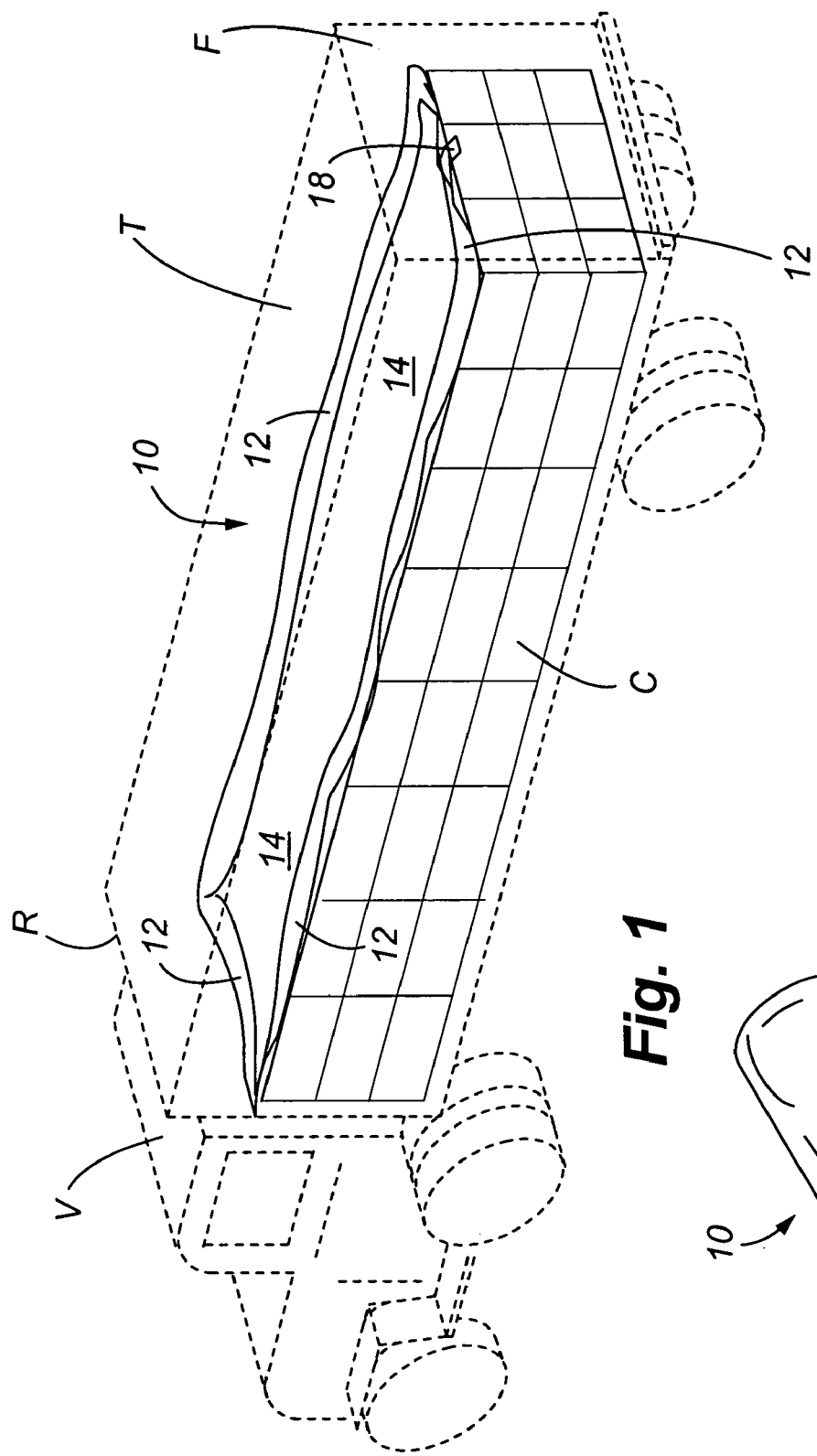
FIG. 1 is a perspective view of the cargo cover of the present invention deployed over cargo loaded within a cargo container.

FIG. 1 illustrates an example cargo load C comprising a plurality of cube-shaped pallets stacked on one another and placed within a cargo trailer T. The cargo C is simply representative of any standard cargo that may be loaded within a cargo container such as the trailer T. The trailer T is normally transported by a vehicle V, such as a tractor-trailer truck. Typically, there is some clearance between the upper surface of the cargo and the ceiling of the trailer. Additionally, there may also exist a gap between the interior sidewalls of the trailer and the exposed sides of the cargo load. The front F and rear R ends of the trailer are defined from the perspective of a user who must load the cargo within the trailer and deploy the cargo cover. The inflatable cargo cover 10 of the present invention as shown is preferably sized so that the cover makes contact with the longitudinal interior sidewalls, as well as front and rear interior sides of the trailer.

Figure 2:
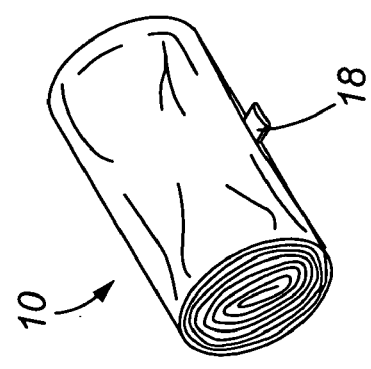
FIG. 2 is a perspective view of the cargo cover in a rolled up or rolled configuration prior to use.
Figure 6:
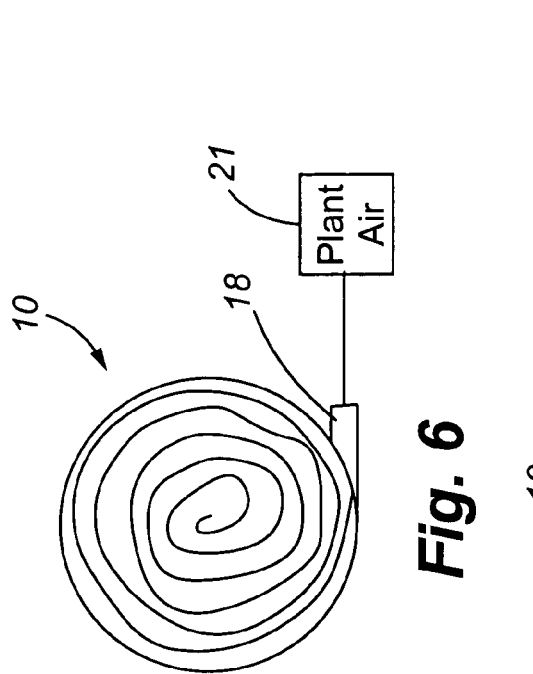
FIG. 6 is an elevation view of the cargo cover prior to being deployed and in the rolled up configuration.
Figure 7:
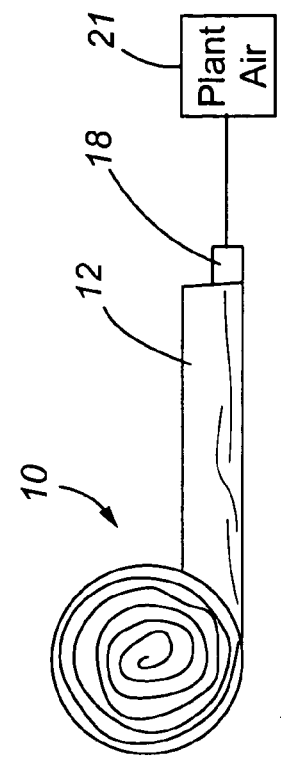
FIG. 7 is another elevation view illustrating the cargo cover being deployed.
Figure 5:
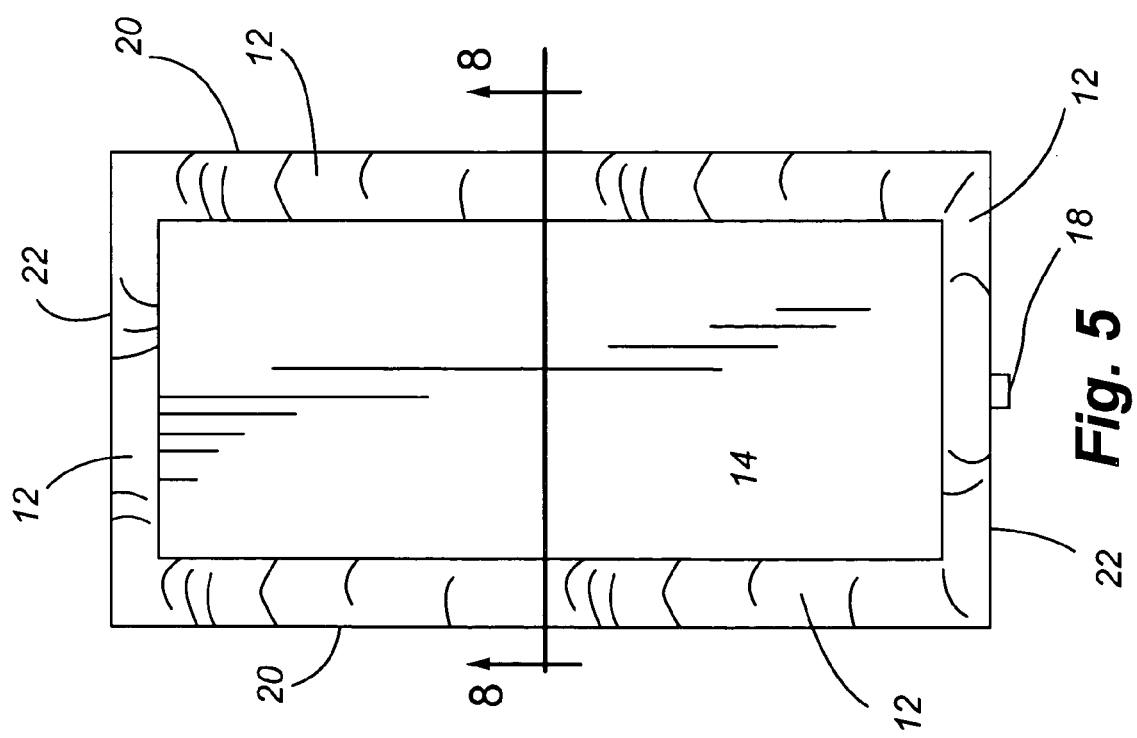
FIG. 5 is a plan view of the cargo cover when deployed.
Figure 8:
FIG. 8 is an enlarged vertical section taken along line 8—8 of FIG. 5 illustrating structural details of the cargo cover.

Referring to FIGS. 2 and 5, the particular structure of the cargo cover is shown. FIG. 2 shows the cargo cover when rolled up, and FIG. 5 illustrates the cargo cover when fully deployed. The cargo cover 10 is defined by an inflatable portion 12, which defines a periphery of the cargo cover. Preferably, the inflatable portion forms a continuous passageway or pocket and traverses along the longitudinal sides 20 as well as the transverse sides 22 of the cover. An inflation port 18 is formed on one of the transverse sides of the inflatable portion. An interior panel or center section 14 spans between and connects to the inflatable portion 12.

Referring to FIGS. 3, 4, 6 and 7, deployment of the cargo cover is illustrated. First, a user places the cover 10 over the most forward portion of the cargo load. An inflation source such as a plant air 21 is then connected to the inflation port 18 and the inflatable portion 12 inflates. As the inflatable portion inflates, the cargo cover unrolls and extends over the cargo load. Preferably, the cargo cover is sized so that the longitudinal edges 20 and transverse edges 22 contact the interior sidewalls of the cargo container thus ensuring that the cargo is fully covered. If there is a substantial gap between the longitudinal or lateral sides of the cargo and the interior sidewalls of the cargo container, it may be desirable to size the cargo cover so that when the cargo cover is deployed, the cover is able to drape over the exposed sides of the cargo thus further providing additional insulative protection for the cargo. Of course, the particular shape and size of the cargo cover can be adapted to fit the particular size cargo and space available within a cargo container. After the cover is inflated and fully deployed over the cargo, the inflation device is removed. The inflatable portion then deflates, yet the load remains covered.

Figure 10:
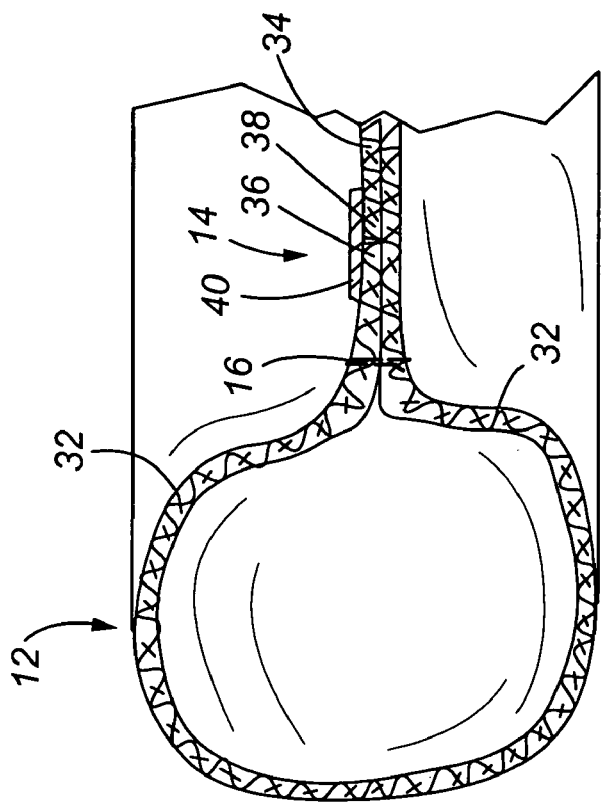
FIG. 10 is another greatly enlarged fragmentary vertical section illustrating another manner in which the cargo cover may be constructed.
Figure 9:
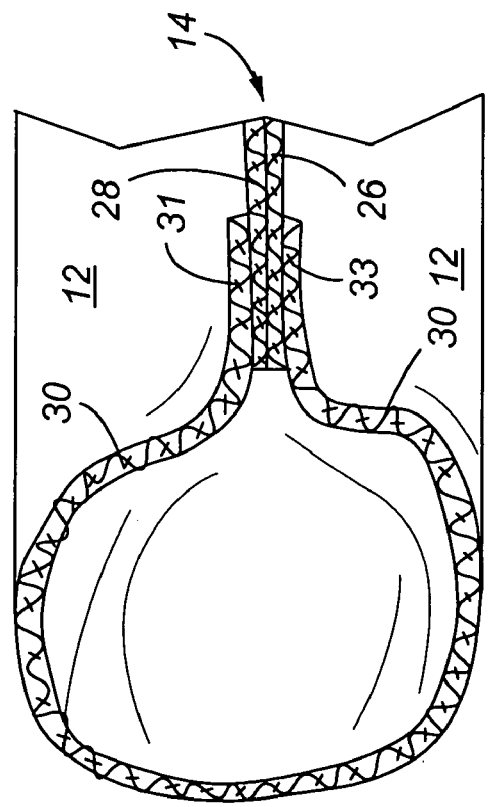
FIG. 9 is a greatly enlarged fragmentary vertical section illustrating one manner in which to construct the cargo cover.

Referring to FIGS. 9 and 10, alternative constructions are illustrated for the cargo cover. In FIG. 9, the interior panel 14 can be made of two layers or sheets of material, shown as sheets 26 and 28. The inflatable portion 12 can be constructed of a third piece of material 30 having one side or end 31 that attaches to sheet 28, and an opposite end 33 that attaches to sheet 26. The sheets 26, 28 and piece 30 may be joined to one another by stitching, gluing, heat sealing, or any other known method of attaching sheet-like materials. The line defining the areas where the sheets/piece are joined can be referred to as a connection line.

Referring to FIG. 10, an alternative method of construction is illustrated. According to this method, only two sheets of material are required, namely, sheets 32 and 34. Sheets 32 and 34 are connected end-to-end to form a continuous loop of material. One of the connections is illustrated in FIG. 10 wherein end 36 of sheet 32 is attached to end 38 of sheet 34. A piece of adhesive tape 40 or a stitch may be used to secure the abutting ends 36 and 38. The connection to attach the other ends of the panels to one another (not illustrated), can be achieved in the same manner by use of a strip of tape or adhesive material. A connection line is then provided along the periphery of the joined sheets to form the inflatable portion 12. This connection 16 in FIG. 10 is shown as a stitch and can be positioned to create a desired sized passage for the inflatable portion.

Yet another method of construction is to simply place two sheets of material over one another, establish a connection line along a periphery of the sheets, and then provide another connection line spaced interiorly of the periphery thereby creating an inflatable portion. A port can then be formed in the inflatable portion. Excess material extending beyond the peripheral connection line can be trimmed.

Although a leak proof seal is desirable along the connection lines, it is not absolutely critical it is only necessary to provide an inflation source that will allow the cargo cover to inflate so that it can deploy over the cargo.

There are many advantages to the present invention. The cargo cover may be easily deployed by a single individual, and the individual can deploy the cargo cover without having to enter the cargo container and manually adjust the cargo cover. During inflation, the user may have to slightly shift the orientation of the cover with respect to the cargo load; however, because of the light weight of the cover, these minor adjustments can also be carried out by the same individual. The cargo cover of the present invention is also easily stored for use and transported between cargo containers. The cargo cover can be rolled in a tight configuration that also allows a single individual to move the cover without the aid of heavy equipment or the assistance of another person. In quality testing, the cargo cover has been shown to provide adequate insulation for cargo loads thus, there is no appreciable degradation in the ability of the cargo cover to insulate cargo as compared to currently available cargo covers. The cargo cover of the present invention also provides increased safety for a user since the cargo cover is much lighter and is self-deployable by use of a simple inflation source such as plant air. Ultimately, use of the cargo cover increases employee productivity because the cargo cover can be installed in a much more efficient manner than traditional cargo blankets.

While the foregoing invention has been described with reference to preferred embodiments, it shall be understood that various other changes may be made to the present invention that fall within the scope of the claims appended hereto.

We claim:

1. An inflatable cargo cover comprising:
   an inflatable portion defining a periphery of said cover, said inflatable portion having a continuous passageway formed therein;
   an interior panel connected to and spanning between said inflatable portion;
   an inflation port formed on said inflatable portion and communicating with said passageway therein; and
   wherein said cover is rolled-up prior to deployment over cargo, an inflation source inflates said inflatable portion through said port, and as said inflatable portion becomes inflated, said cover is deployed over the cargo.

2. A cover, as claimed in claim 1, wherein:
   said inflatable portion and said interior panel are joined along a connection line defining a perimeter of said interior panel.

3. A cover as claimed in claim 1, wherein:
   said cover has a rectangular shape when deployed.

4. A cover, as claimed in claim 1, wherein:
   said cover has a substantially cylindrical shape when rolled-up.

5. A cover, as claimed in claim 1, wherein:
   said inflatable portion has a tubular shape.

6. A cover, as claimed in claim 1, wherein:
   said interior panel includes first and second pieces of material stacked on one another, and said inflatable portion includes a third piece of material formed in a tubular shape and joined to said first and second pieces.

7. A cover, as claimed in claim 1, wherein:
   said inflatable portion includes a pair of opposing longitudinal sides substantially parallel to one another, a pair of transverse sides extending substantially parallel to one another, and said transverse sides interconnecting said longitudinal sides.

8. A cover, as claimed inn claim 1, wherein:
   said cover is constructed by first and second pieces of material joined end-to-end to form a continuous loop, said inflatable portion being formed by a connection spaced interiorly from a periphery of said pieces of material and said connection extending in a continuous pattern across said first and second pieces thus also joining said first and second pieces, and said port being formed by creating an opening in said inflatable portion whereby flow of air entering said inflatable portion through said port travels through said inflatable portion.

9. A method of deploying a cargo cover over a cargo, said method comprising the steps of:
   providing an inflatable portion defining a periphery of said cover, said inflatable portion having a continuous passageway formed therein;
   providing an interior panel connected to and spanning between said inflatable portion;
   providing an inflation port on said inflatable portion and communicating with said passageway therein;
   rolling up the cargo cover leaving the inflation port exposed;
   applying a flow of air through said port and into said cover causing said inflatable portion to begin to inflate;
   unrolling said cover as said inflatable portion inflates by air pressure in the inflatable portion that forces the cover to unroll; and
   fully deploying the cover over the cargo to cover said cargo by continuing to inflate the inflatable portion whereby the cover is fully extended over the cargo.

10. A method, as claimed in claim 9, further including the step of:
    removing the flow of air from the inflation port thereby allowing said inflatable portion to deflate.

11. A method of providing insulation for a cargo loaded in a cargo container, said method comprising the steps of:
    providing a cargo loaded in a cargo carrier having a floor, roof, and sidewalls interconnecting the floor and roof, said cargo carrier enclosing the cargo therein;
    providing a cargo cover placed at an end of the cargo carrier, said cargo cover having a width spanning between said sidewalls and a length when deployed that extends substantially a length of the cargo carrier, said cover being placed in a rolled configuration at the end of the cargo carrier;
    applying a source of pressurized air to inflate said cargo cover; and
    deploying said cargo cover by unrolling said cargo cover due to said pressurized air entering said cargo cover, said cargo cover being fully deployed when said cargo covering is unrolled and substantially cover said cargo.

12. A method, as claimed in claim 11, wherein:
    said cargo cover has a peripheral channel for receiving the pressurized air.

13. A method, as claimed in claim 12, wherein:
    said peripheral channel extends at least along lateral sides of said cargo cover and along one end of said cargo cover.

14. A method, as claimed in claim 11, wherein:
    said cargo cover has a port for receiving the air, a peripheral channel extending along at least a portion of a periphery of the cargo cover, and an interior section spanning between the peripheral channel.

15. A method, as claimed in claim 1, wherein:
    said cargo cover is made of multiple layers of material.

16. A method, as claimed in claim 11, wherein:
    said cargo cover when rolled has opposing lateral sides folded toward a center line of said cargo cover.

17. A method, as claimed in claim 1, wherein:
    said cargo cover deflates after deployment.

18. A method, as claimed in claim 11, wherein:
    said cargo cover is roll folded.

19. A method, as claimed in claim 11, wherein:
    said cargo cover is made of multiple sheets of material, and a peripheral channel was formed in said cargo cover for receiving the source of pressurized air.

* * * * *